UNITED STATES PATENT OFFICE.

JAMES BENNETT FORSYTH, OF BOSTON, MASSACHUSETTS.

IMPROVEMENT IN VULCANIZING HOSE OR TUBING.

Specification forming part of Letters Patent No. 168,088, dated September 28, 1875; application filed May 31, 1875.

*To all whom it may concern:*

Be it known that I, JAMES BENNETT FORSYTH, of Boston, in the county of Suffolk and State of Massachusetts, have invented an Improvement in the Art of Vulcanizing Rubber in the form of Hose or Tubing, of which the following is a specification:

Nearly all tubing now made of vulcanizable compounds is vulcanized on carriages, which are run into a large heater or cylinder, the door of which is closed steam-tight, and the heater is then filled with steam. These carriages are commonly over fifty feet in length, that being the usual length of hose. The apparatus therefore is very expensive, and also requires a very large quantity of steam. This process also requires from three to five hours.

I have already made application for a patent for a new process for vulcanizing tubing, designed to do away with the use of expensive carriages and heaters, and to save steam and time; but that process is limited in its application, as, if used with a tube of vulcanizable compound much over one-eighth of an inch in thickness, there is great danger of overheating the interior of the tube.

My present process is also designed to save time, steam, and expensive apparatus; but is applicable to all kinds of hose. It consists in curing hose by means of heat applied internally while the hose is surrounded by a heated atmosphere, so that the atmosphere surrounding the hose not only acts as a non-conducting covering, and thus prevents the waste of the heat applied internally, but in addition aids in raising the temperature of the hose to the desired point.

The apparatus used for applying the heat internally is the same as that described in my application now pending—that is, it consists of a hollow mandrel connected by proper couplings to a reservoir of steam, or its equivalent. The mandrel is introduced into the hose, or the hose is made up upon it, after which the mandrel is connected to the couplings, and the heating medium introduced into the hollow mandrel, all as described in my pending application; but during the application of the internal heat the hose is within a chamber in which the atmosphere is confined and heated; and it is this external application of heated air in combination with internal heat, which is the distinguishing peculiarity of my present invention.

The main object of using the hollow mandrel is to prevent the contact of the heating medium with the interior of the hose; but where this is not objectionable (as it is not in a large large class of hose where steam is the heating medium) I dispense with the hollow mandrel, and connect the hose itself directly with the couplings. The process is otherwise precisely the same.

The simplest mode of applying heated air externally is to use a box upon the bench or table, which covers the hose as it lies upon the bench, and also covers a series of steam-pipes which lie parallel to the hose. Three one-inch pipes, one under the hose and one on each side of it, will raise the temperature of the air in a box, reasonably tight, and about one foot square by fifty-two feet long, to over 200° Fahrenheit, with steam at about fifty pounds' pressure; and with this apparatus a section of fifty in length of the ordinary rubber hose for fire-engines can be cured in from twenty-five to fifty minutes, depending upon the compound and the internal temperature used. The exterior of the hose should be kept from contact with the steam-pipes.

The air can be raised, of course, to a much higher temperature by increasing the number or capacity of the pipes or the temperature of the heating medium, and the pipes themselves may be so arranged as to form the chamber for the heated air; but these matters will be well understood by all skilled in the art without further description.

What I claim as my invention is—

The improvement in the art of vulcanizing hose, above described, consisting in introducing the heating medium through pipes into the hose while the hose is surrounded by heated air.

JAMES BENNETT FORSYTH.

Witnesses:
J. E. MAYNADIER,
J. E. KNOX.